US009815596B1

(12) United States Patent
Leveille (10) Patent No.: US 9,815,596 B1
(45) Date of Patent: Nov. 14, 2017

(54) CONTAINER WITH CALORIE INFORMATION DISPLAY (71) Applicant: Patchiouky Leveille, Everett, MA (US)

(72) Inventor: Patchiouky Leveille, Everett, MA (US)

( * ) Notice: Subject to any disclaimer, the term of this patent is extended or adjusted under 35 U.S.C. 154(b) by 216 days.

(21) Appl. No.: 14/792,766

(22) Filed: Jul. 7, 2015

(51) Int. Cl.
G06K 7/10 (2006.01)
G06K 19/077 (2006.01)
G06F 3/13 (2006.01)
B65D 25/20 (2006.01)
G06F 3/14 (2006.01)

(52) U.S. Cl.
CPC ............ B65D 25/205 (2013.01); G06F 3/14 (2013.01); G06K 7/10722 (2013.01); G06K 19/07707 (2013.01)

(58) Field of Classification Search
CPC G06K 7/10722; G06K 19/07707; G06F 3/14; B65D 25/205
See application file for complete search history.

(56) References Cited

U.S. PATENT DOCUMENTS

| 4,575,804 A * | 3/1986 | Ratcliff | G01G 19/4146 177/25.16 |
| 5,819,735 A * | 10/1998 | Mansfield | G06F 15/025 128/921 |
| 5,955,961 A * | 9/1999 | Wallerstein | G06Q 20/3415 235/380 |
| 6,283,914 B1 | 9/2001 | Mansfield | |
| 6,796,507 B2 * | 9/2004 | Bean | G06Q 30/02 235/462.14 |
| 6,978,221 B1 * | 12/2005 | Rudy | G01G 19/4146 128/921 |
| D530,685 S | 10/2006 | Dupuis | |
| 7,432,454 B1 * | 10/2008 | Sze | G01G 19/4146 128/921 |
| 8,725,842 B1 * | 5/2014 | Al-Nasser | G04G 17/08 367/11 |
| 9,183,480 B1 * | 11/2015 | Quigley | G06K 19/06196 |
| 9,701,530 B2 * | 7/2017 | Kline | B67D 1/0888 |
| 2002/0099610 A1 * | 7/2002 | Marion | G06F 3/147 705/21 |
| 2003/0069846 A1 * | 4/2003 | Marcon | G06Q 20/105 705/41 |
| 2003/0208113 A1 * | 11/2003 | Mault | A61B 5/14532 600/316 |
| 2003/0208409 A1 * | 11/2003 | Mault | G06F 19/3475 705/15 |

(Continued)

FOREIGN PATENT DOCUMENTS

CN 202436734 9/2012

Primary Examiner — Daniel Walsh (57) ABSTRACT

The container with calorie information display is an electronic display device that is adapted for use with food containers. The container with calorie information display is used to display nutritional information about the food that is stored in the container. The container with calorie information scans the nutritional label of the items being stored in the container and electronically displays the information on a display that is adapted to fit on the container. Alternative embodiments of the disclosure include a memory function to permanently store nutritional information for repeatedly stored items and an optical character recognition function and scale function that allows for the display of the total nutritional contents of the container.

1 Claim, 6 Drawing Sheets

(56) References Cited

U.S. PATENT DOCUMENTS

| | | | |
|---|---|---|---|
| 2003/0219513 A1* | 11/2003 | Gordon | A23L 35/00 426/87 |
| 2004/0035927 A1* | 2/2004 | Neumark | G01S 5/04 235/385 |
| 2004/0177032 A1* | 9/2004 | Bradley | G06K 17/00 705/38 |
| 2005/0025864 A1* | 2/2005 | Gordon | B65D 5/4212 426/231 |
| 2005/0103572 A1* | 5/2005 | Simon | A47F 10/06 186/38 |
| 2005/0156032 A1* | 7/2005 | Milstein | G06Q 30/06 235/383 |
| 2005/0184148 A1* | 8/2005 | Perlman | G01G 23/3735 235/383 |
| 2005/0189412 A1* | 9/2005 | Hudnut | A47F 9/046 235/383 |
| 2005/0275177 A1* | 12/2005 | Buckley, III | B62B 3/1468 280/47.34 |
| 2006/0036395 A1* | 2/2006 | Shaya | G01G 19/4146 702/127 |
| 2006/0208072 A1* | 9/2006 | Ku | G06K 7/0008 235/383 |
| 2006/0237427 A1* | 10/2006 | Logan | E05B 47/0002 219/401 |
| 2006/0289637 A1* | 12/2006 | Brice | G06Q 10/087 235/385 |
| 2007/0034700 A1* | 2/2007 | Poidomani | G06K 19/0702 235/492 |
| 2007/0059672 A1* | 3/2007 | Shaw | G09B 19/0092 434/127 |
| 2008/0102175 A1* | 5/2008 | Jeon | F24C 15/14 426/233 |
| 2009/0063176 A1* | 3/2009 | French | G06Q 10/087 705/21 |
| 2009/0176526 A1* | 7/2009 | Altman | G06F 19/3475 455/556.1 |
| 2009/0192901 A1* | 7/2009 | Egeresi | G06Q 10/00 705/15 |
| 2009/0205874 A1* | 8/2009 | Rump | G01G 19/4146 177/1 |
| 2009/0289536 A1 | 11/2009 | Park | |
| 2011/0163084 A1* | 7/2011 | Pinkert | F24C 15/30 219/601 |
| 2011/0168456 A1* | 7/2011 | Sharawi | G01G 23/3728 177/25.16 |
| 2011/0174874 A1* | 7/2011 | Poznansky | G06K 19/12 235/379 |
| 2012/0135384 A1* | 5/2012 | Nakao | A23L 33/30 434/127 |
| 2012/0179665 A1* | 7/2012 | Baarman | G06F 19/3475 707/709 |
| 2013/0008322 A1* | 1/2013 | Lee | A47J 43/0716 99/493 |
| 2013/0032634 A1* | 2/2013 | McKirdy | G06Q 30/0271 235/375 |
| 2013/0105565 A1* | 5/2013 | Kamprath | G06F 19/3475 235/375 |
| 2013/0191640 A1* | 7/2013 | Bloomer | G09C 5/00 713/172 |
| 2013/0289886 A1* | 10/2013 | Ricks | G06F 19/3475 702/19 |
| 2013/0332322 A1* | 12/2013 | Perkins | B62B 3/148 705/28 |
| 2014/0063180 A1* | 3/2014 | Sharma | G08C 19/00 348/36 |
| 2014/0304122 A1* | 10/2014 | Rhoads | G06Q 30/0643 705/27.2 |
| 2015/0168365 A1* | 6/2015 | Connor | G01N 33/02 356/51 |
| 2015/0295919 A1* | 10/2015 | Van Kerrebroeck | H04L 63/0853 726/9 |
| 2016/0034764 A1* | 2/2016 | Connor | G06K 9/00771 348/158 |
| 2016/0035248 A1* | 2/2016 | Gibbs | G06T 7/0002 434/127 |
| 2017/0095405 A1* | 4/2017 | Afsarifard | A61J 7/0418 |

\* cited by examiner

CONTAINER WITH CALORIE INFORMATION DISPLAY

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of automated displays, more specifically, an electronic display configured for use with containers.

SUMMARY OF INVENTION

The container with calorie information display is an electronic display device that is adapted for use with food containers. The container with calorie information display is used to display nutritional information about the food that is stored in the container. The container with calorie information scans the nutritional label of the items being stored in the container and electronically displays the information on a display that is adapted to fit on the container. Alternative embodiments of the disclosure include a memory function to permanently store nutritional information for repeatedly stored items and an optical character recognition function and scale function that allows for the display of the total nutritional contents of the container.

These together with additional objects, features and advantages of the container with calorie information display will be readily apparent to those of ordinary skill in the art upon reading the following detailed description of the presently preferred, but nonetheless illustrative, embodiments when taken in conjunction with the accompanying drawings.

In this respect, before explaining the current embodiments of the container with calorie information display in detail, it is to be understood that the container with calorie information display is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the container with calorie information display.

It is therefore important that the claims be regarded as including such equivalent construction insofar as they do not depart from the spirit and scope of the container with calorie information display. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
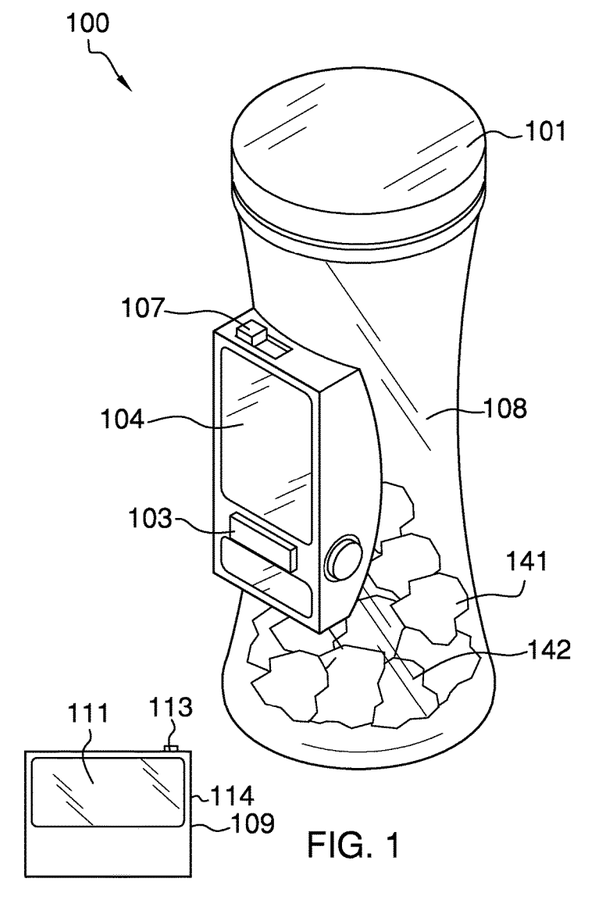
FIG. 1 is a perspective view of an embodiment of the disclosure.
Figure 2:
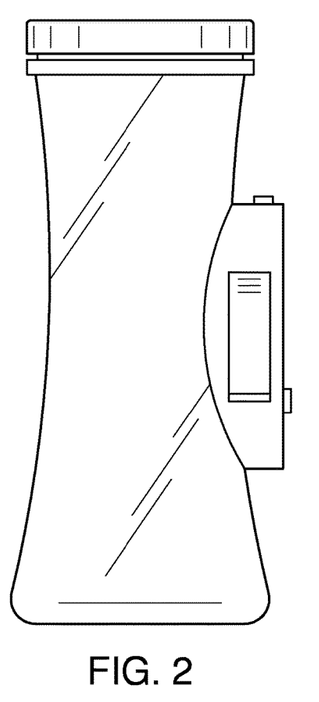
FIG. 2 is a side view of an embodiment of the disclosure.
Figure 3:
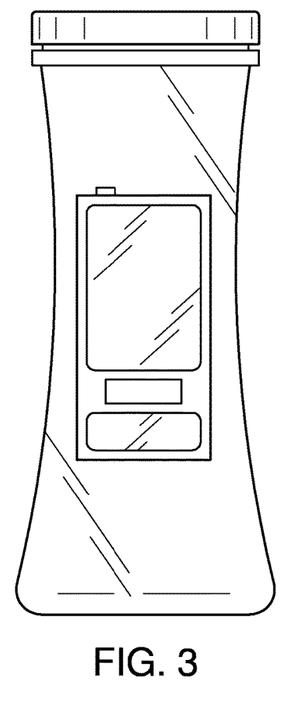
FIG. 3 is a front view of an embodiment of the disclosure.
Figure 4:
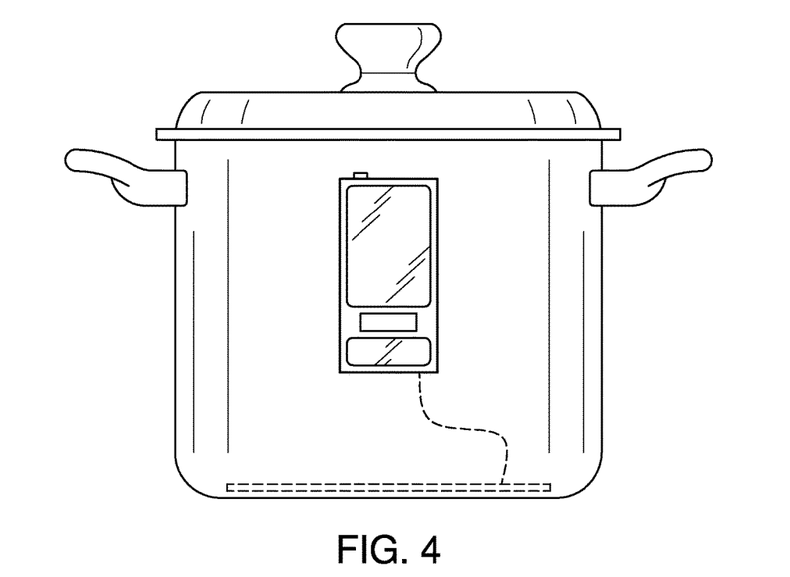
FIG. 4 is a front view of an embodiment of the disclosure.
Figure 5:
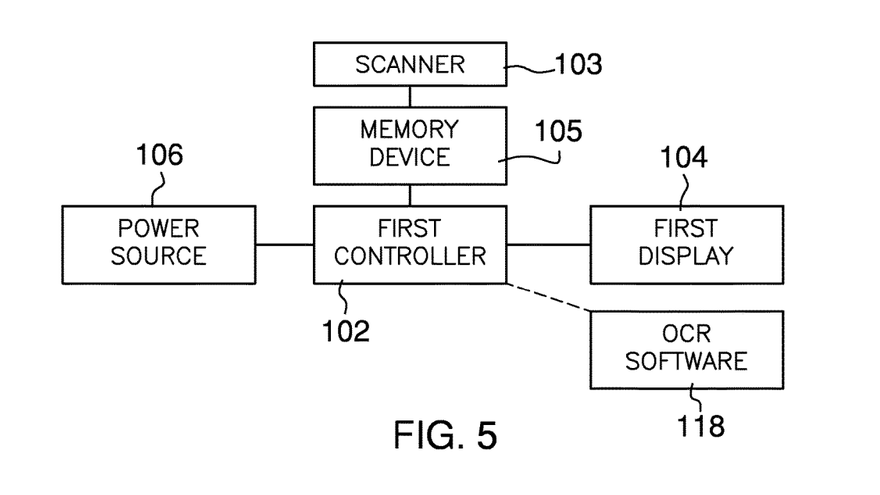
FIG. 5 is a schematic view of an embodiment of the disclosure.
Figure 6:
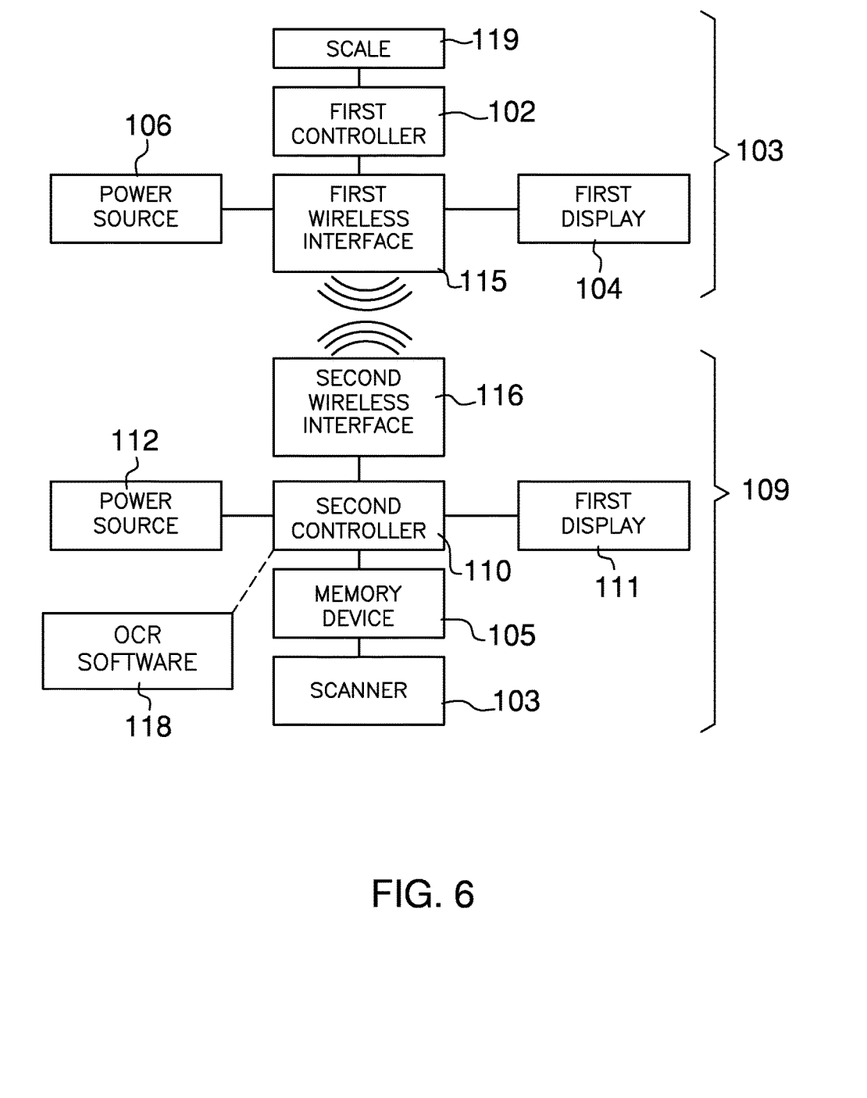
FIG. 6 is a schematic view of an embodiment of the disclosure.
Figure 7:
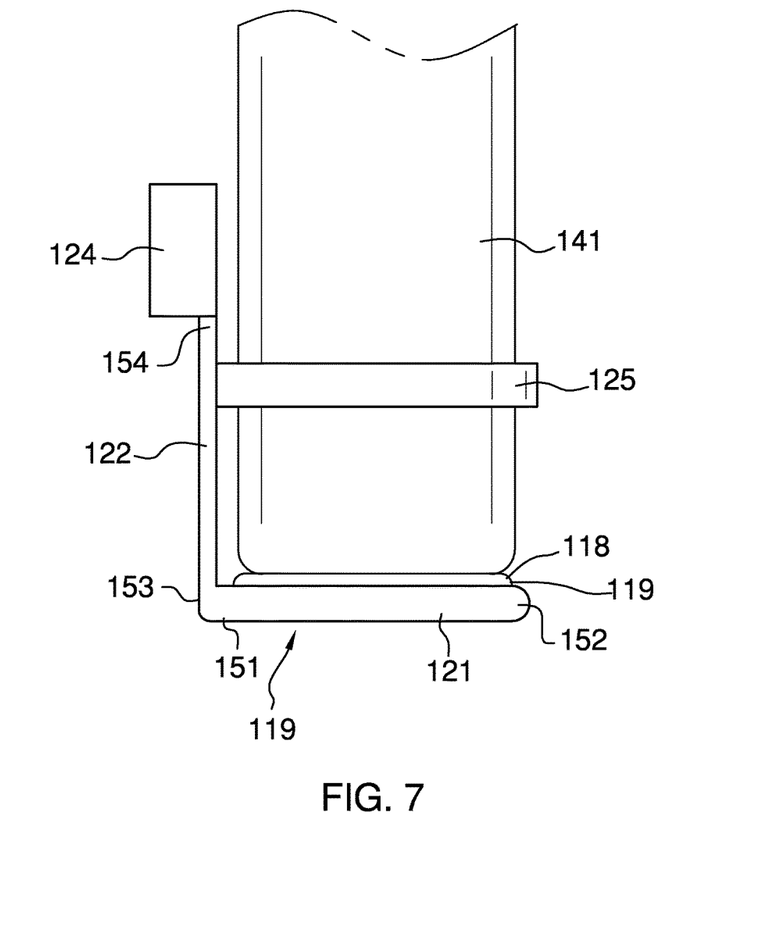
FIG. 7 is a side view of an embodiment of the disclosure.
Figure 8:
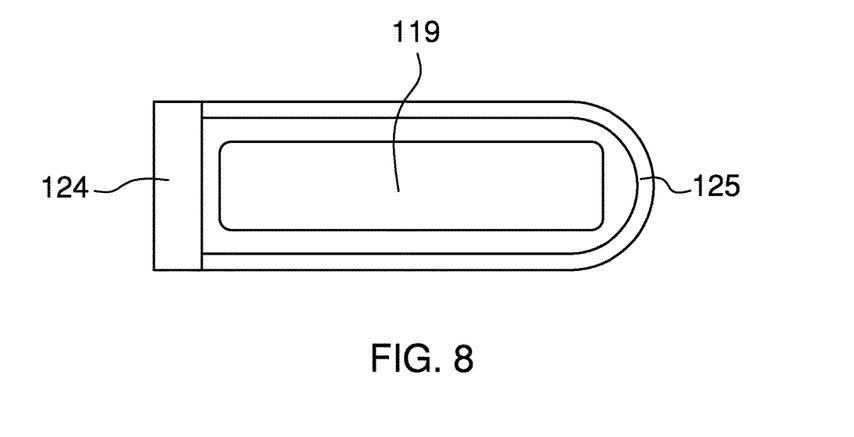
FIG. 8 is a top view of an embodiment of the disclosure.

Detailed reference will now be made to a first potential embodiment of the disclosure, which is illustrated in FIGS. 1 through 8.

The first potential embodiment of the disclosure, the container with calorie information display 100 (hereinafter invention) comprises a container station 101. The purpose of the container station 101 is to: 1) be attached to a food container 141; 2) scan the image of the nutritional information contained in the nutritional information label associated with the contents 142 contained in the food container 141; and, 3) to display the image on a first display 104 incorporated into the container station 101. The container station 101 comprises a first microcontroller 102, a scanner 103, a first display 104, a memory device 105, a first power source 106, a first on off switch 107, and a first housing 108.

The first housing 108 is a structure that is mounted on the outside of the food container 141. The first housing 108 is large enough to contain the first microcontroller 102, first power source 106 and a memory device 105. The first housing 108 has mounted on it the scanner 103, the first display 104, and the first on off switch 107.

The scanner 103 is a wand scanner that is used to capture the image of the nutritional label. The standard controls provided with the wand scanner are used to control the scanner 103. The battery provided with the wand scanner is used to power the scanner 103. The image captured by the scanner 103 is stored in a memory device 105. In the first potential embodiment of the disclosure, the memory device 105 is a secure digital (hereinafter SD) memory card 117.

The image stored in the SD memory card 117 is retrieved by the first microcontroller 102 and processed for display on the first display 104. The first display 104 is a liquid crystal display.

The first microcontroller 102 and the first display 104 are powered from the first power source 106. The first power source 106 can be supplied as a battery or as a series of photoelectric cells. Power and operation are controlled by the first on off switch 107 that controls the flow of power from the first power source 106 to the invention 100. The SD memory card 117 can be powered from the scanner 103 battery or the first power source 106.

To use the first embodiment of the disclosure, the first on off switch 107 and the scanner 103 are turned on. The user then initiates the scanner 103 which is used to scan the nutrition label from a package. The scanner 103 stores the scanned information as an image in the SD memory card 117. The first microcontroller 102 downloads the image from the SD memory card 117 and displays this image on the first display 104. When the contents 142 of the food container 141 are changed, the new nutritional information label is scanned and the prior image file is replaced with the new image file. The first microcontroller 102 is power cycled and on power up the first microcontroller 102 will download and display the new image.

In a first optional scenario, several scans can be stored on the SD memory card 117 for reuse by the first microcontroller 102. In this first optional scenario, a touchscreen liquid crystal display is selected to be the first display 104. To change the displayed nutritional information displayed, the user touches the first display 104 which brings up a menu of the stored nutritional information images. The user selects the appropriate image and the first microcontroller 102 downloads the image and displays it on the first display 104.

The second potential embodiment of the disclosure comprises a container station 101 and a remote station 109. The purpose of the container station 101 is to: 1) be attached to a food container 141; and, 2) to display an image on the first display 104. The purpose of the remote station 109 is to 1) scan the image of the nutritional information contained in the nutritional information label associated with to the contents 142 contained in the food container 141; 2) store the image of the nutritional information label attached to the contents 142 contained in the food container 141; and 3) transmit the image of the nutritional information label associated with the contents 142 contained in the food container 141 to the container station 101 for display.

The container station 101 comprises a first microcontroller 102, a first display 104, a first power source 106, a first on off switch 107, a first housing 108, and a first wireless interface 115. The remote station 109 comprises a second microcontroller 110, a scanner 103, a second display 111, a memory device 105, a second power source 112, a second on off switch 113, a second housing 114 and a second wireless interface 116.

The first housing 108 is a structure that is mounted on the outside of the food container 141. The first housing 108 is large enough to contain the first microcontroller 102, first power source 106, and the first wireless interface 115. The first housing 108 has mounted on it the first display 104 and the first on off switch 107. The second housing 114 is a structure that sits on a shelf or counter. The housing is large enough to contain the second microcontroller 110, second power source 112, a memory device 105, and the second wireless interface 116. The second housing 114 has mounted on it the scanner 103, the second display 111, and the second on off switch 113.

The scanner 103 is a wand scanner that is used to capture the image of the nutritional label. The standard controls provided with the wand scanner are used to control the scanner 103. The battery provided with the wand scanner is used to power the scanner 103. The image captured by the scanner 103 is stored in the memory device 105. In the second potential embodiment of the disclosure, the memory device 105 is an SD memory card 117. The image stored in the SD memory card 117 is retrieved by the second microcontroller 110 and processed for transmittal through the second wireless interface 116 to the first wireless interface 115. The second display 111 is a liquid crystal display touchscreen display. The second display 111 is used to display error messages and to receive user commands and inputs when required.

The second microcontroller 110 and the second display 111 are powered from the second power source 112. The second power source 112 can be supplied from an external 120 Vac supply, a battery or as a series of photoelectric cells. Power and operation of the remote station 109 are controlled by a second on off switch 113 that controls the flow of power from the second power source 112 to the remote station 109. The SD memory card 117 can be powered from the scanner 103 battery or the first power source 106.

To use the second embodiment of the disclosure, the second on off switch 113 and the scanner 103 are turned on. The user then initiates the scanner 103 which is used to scan the nutrition label from a package. The scanner 103 stores the scanned information as an image in the SD memory card 117. When the first microcontroller 102 is turned on, the first microcontroller 102 sends a query to the second wireless interface 116 using the first wireless interface 115. The second wireless interface 116 receives the query and passes it to the second microcontroller 110. The second microcontroller 110 retrieves the stored image from the SD memory card 117, processes and passes the image to the second wireless interface 116 which transmits the information to the first wireless interface 115. The first wireless interface 115 relays the image to the first microcontroller 102 which displays the image on the first display 104. To change the image displayed on a container station 101, first microcontroller 102 is power cycled and on power up the first microcontroller 102 will query the remote station 109 for a new image.

In a second optional scenario, several scans can be stored on the SD memory card 117 for reuse by the invention 100. In this second optional scenario, a touchscreen liquid crystal display is selected to be the first display 104. To change the displayed nutritional information displayed, the user touches the first display 104 which prompts the first microcontroller 102 to query the remote station 109 which transmits back to the container station 101 a menu of the stored nutritional information images. The user selects the appropriate image and the first microcontroller 102 downloads the selected image from remote station 109 and displays it on the first display 104.

The third potential embodiment of the disclosure comprises a container station 101. The purpose of the container station 101 is to: 1) be attached to a food container 141; 2) scan the nutritional information contained in the nutritional information label associated with the contents 142 contained in the food container 141; 3) use optical character recognition software 118 to load a database with nutritional information collected from the nutritional information contained in the nutritional information label associated with the contents 142; 4) weigh the contents 142 of the food container 141; and, 5) to display the nutritional content of the contents 142 contained in the container station 101. The container station 101 comprises a first microcontroller 102, a scanner 103, a first display 104, a memory device 105, optical character recognition software 118, a first power source 106, a first on off switch 107, and a third housing 120.

The third housing 120 is a free standing structure that is adapted to receive the food container 141. The third housing 120 further comprises a processor box 124, a front panel 122, a container guide 123, a base 121, and a scale 119. The base 121 is the foundation of the third housing 120. The base 121 is further defined with a first end 151 and a second end 152. Mounted on top of the base 121 is the scale 119. Located at the first end 151 of the base 121 is the front panel 122. The front panel 122 projects perpendicularly away from the base 121 and is further defined with a third end 153 and a fourth end 154. The third end 153 of the front panel 122 is joined to the first end 151 of the base 121. The fourth end 154 of the front panel 122 is the end distal from the third end 153 of the front panel 122. The processor box 124 is attached to the fourth end 154 of the front panel 122. The container guide 123 is attached to the front panel 122 at a location between the base 121 and the processor box 124. The container guide 123 projects perpendicularly away from the front panel 122. The container guide 123 is formed in the shape of a loop 125 that is sized to receive the food container 141. The third housing 120 is adapted to receive the food container 141 within the container guide 123 so that it rests on the scale 119 and that the container's 141 movement is constrained by the container guide 123 and the front panel 122.

The processor box 124 is large enough to contain the first microcontroller 102, first power source 106 a memory device 105. The processor box 124 has mounted on it the scanner 103, the first display 104, and the first on off switch 107. The food container 141 is placed within the container guide 123 so that it rests on the scale 119 and that its movement is constrained by the container guide 123 and the front panel 122.

The purpose of the scale 119 is to measure the weight of the food container 141. The first microcontroller 102 takes the measured weight of the food container 141 and subtracts a previously stored tare weight of the food container 141 to find the net weight of the contents 142. The scale 119 is an electronic scale with a computer interface that is connected to the first microcontroller 102. The scale 119 is powered by the power source provided with the scale 119.

The scanner 103 is a wand scanner that is used to capture the image of the nutritional label. The standard controls provided with the wand scanner are used to control the scanner 103. The battery provided with the wand scanner is used to power the scanner 103. The image captured by the scanner 103 is stored in a memory device 105. In the third potential embodiment of the disclosure, the memory device 105 is an SD memory card 117. The image stored in the SD memory card 117 is retrieved by the first microcontroller 102 and processed for display on the first display 104. The first display 104 is a liquid crystal display.

The first microcontroller 102 and the first display 104 are powered from the first power source 106. The first power source 106 can be supplied as a battery or as a series of photoelectric cells. Power and operation are controlled by the first on off switch 107 that controls the flow of power from the first power source 106 to the invention 100. The SD memory card 117 can be powered from the scanner 103 battery or the first power source 106.

The first microcontroller 102 is loaded with optical character recognition software 118. Once the image of the nutrition label has been scanned, the first microcontroller 102 uses the optical character recognition software 118 to analyze the image and extract the following information: serving size, calories per serving, grams of fat per serving, grams of carbohydrates per serving, and grams of protein per serving. This information is then stored by the first microcontroller 102 on the SD memory card 117.

To use the third embodiment of the disclosure, the first microcontroller 102 is turned on and the empty container 141 is placed in the third housing 120. The first microcontroller 102 records the tare weight of the food container 141. Next the scanner 103 is turned on. The user initiates the scanner 103 which is used to scan the nutrition label from a package. The scanner 103 stores the scanned information as an image in the SD memory card 117. The first microcontroller 102 downloads the image from the SD memory card 117 and processes the image to extract the serving size, the calories per serving, the grams of fat per serving, the grams of carbohydrates per serving, and the grams of protein per serving. The first microcontroller 102 takes this information and stores it in the SD memory card 117. The first microcontroller 102 then takes the weight from the scale 119 and subtracts the tare weight to get the net weight. The first microcontroller 102 next takes the serving size information and calculates the number of servings contained in the food container 141. Using the number of servings estimate, the first microcontroller 102 can then estimate the number of calories, the number of grams of fat, the number of grams of carbohydrates, and the number of grams of protein that are stored in the food container 141. The first microcontroller 102 then displays this information on the first display 104. When the contents 142 of the food container 141 are changed, the new nutritional information label is scanned and the prior image file is replaced with the new image file. The first microcontroller 102 is power cycled and on power up the first microcontroller 102 will download and process the new image.

In a third optional scenario, several scans can be stored on the SD memory card 117 for reuse by the first microcontroller 102. In this first optional scenario, a touchscreen liquid crystal display is selected to be the first display 104. To change the displayed nutritional information displayed, the user touches the first display 104 which brings up a menu of the stored nutritional information images. The user selects the appropriate image and the first microcontroller 102 downloads and processes the image and displays the information on the first display 104.

The fourth potential embodiment of the disclosure comprises a container station 101 and a remote station 109. The purpose of the container station 101 is to: 1) be attached to a food container 141; 2) weight the contents 142 of the food container 141; and, 3) to display the nutritional content of the contents 142 contained in the food container 141 station 101.

The purpose of the remote station 109 is to: 1) scan an image of the nutritional information contained in the nutritional information label associated with the contents 142 contained in the food container 141; 2) use optical character recognition software 118 to load a database with nutritional information collected from the nutritional information contained in the image of the nutritional information label associated with the contents 142; 3) store the image and the extracted nutritional information; and, 4) transmit the extracted nutritional information to the container station 101.

The container station 101 comprises a first microcontroller 102, a first display 104, a first power source 106, a first on off switch 107, a third housing 120, a scale 119, and a first wireless interface 115. The remote station 109 comprises a second microcontroller 110, a scanner 103, a second display 111, a memory device 105, a second power source 112, a second on off switch 113, a second housing 114 and a second wireless interface 116.

The third housing 120 is a free standing structure that is adapted to receive the food container 141. The third housing 120 further comprises a processor box 124, a front panel 122, a container guide 123, a base 121, and a scale 119. The base 121 is the foundation of the third housing 120. The base 121 is further defined with a first end 151 and a second end 152. Mounted on top of the base 121 is the scale 119. Located at the first end 151 of the base 121 is the front panel 122. The front panel 122 projects perpendicularly away from the base 121 and is further defined with a third end 153 and a fourth end 154. The third end 153 of the front panel 122 is joined to the first end 151 of the base 121. The fourth end 154 of the front panel 122 is the end distal from the third end 153 of the front panel 122. The processor box 124 is attached to the fourth end 154 of the front panel 122. The container guide 123 is attached to the front panel 122 at a location between the base 121 and the processor box 124. The container guide 123 projects perpendicularly away from the front panel 122. The container guide 123 is formed in the shape of a loop 125 that is sized to receive the food container 141. The third housing 120 is adapted to receive the food container 141 within the container guide 123 so that it rests on the scale 119 and that the container's 141 movement is constrained by the container guide 123 and the front panel 122. The second housing 114 is a structure that sits on a shelf or counter. The second housing 114 is a free standing structure that is large enough to contain the second microcontroller 110, second power source 112, memory device 105, and the second wireless interface 116. The second housing 114 has mounted on it the scanner 103, the second display 111, and the second on off switch 113. The second display 111 is a touch sensitive liquid crystal display.

The processor box 124 is large enough to contain the first microcontroller 102, first power source 106, and first wireless interface 115. The processor box 124 has mounted on it the first display 104 and the first on off switch 107. The food container 141 is placed within the container guide 123 so that it rests on the scale 119 and that its movement is constrained by the container guide 123 and the front panel 122. The first display 104 is a liquid crystal display.

The purpose of the scale 119 is to measure the weight of the food container 141. The first microcontroller 102 takes the measured weight of the food container 141 and subtracts a previously stored tare weight of the food container 141 to find the net weight of the contents 142. The scale 119 is an electronic scale with a computer interface that is connected to the first microcontroller 102. The scale 119 is powered by the power source provided with the scale 119.

The second microcontroller 110 is loaded with optical character recognition software 118. Once the image of the nutrition label has been scanned, the second microcontroller 110 uses the optical character recognition software 118 to analyze the image and extract the following information: serving size, calories per serving, grams of fat per serving, grams of carbohydrates per serving, and grams of protein per serving. This information is then stored by the second microcontroller 110 on the SD memory card 117.

The scanner 103 is a wand scanner that is used to capture the image of the nutritional label. The standard controls provided with the wand scanner are used to control the scanner 103. The battery provided with the wand scanner is used to power the scanner 103. The image captured by the scanner 103 is stored in a memory device 105. In the third potential embodiment of the disclosure, the memory device 105 is an SD memory card 117. The image stored in the SD memory card 117 is retrieved by the second microcontroller 110.

The first microcontroller 102, the first display 104, and the first wireless interface 115 are powered from the first power source 106. The first power source 106 can be supplied as a battery or as a series of photoelectric cells. Power and operation are controlled by the first on off switch 107 that controls the flow of power from the first power source 106 to the invention 100.

The second microcontroller 110 and the second display 111 are powered from the second power source 112. The second power source 112 can be supplied as from an external 120 Vac supply, a battery or as a series of photoelectric cells. Power and operation of the remote station 109 are controlled by a second on off switch 113 that controls the flow of power from the second power source 112 to the invention 100. The SD memory card 117 can be powered from the scanner 103 battery or the second power source 112.

To use the fourth embodiment of the disclosure, the second on off switch 113 and the scanner 103 are turned on. The user then initiates the scanner 103 which is used to scan the nutrition label from a package. The scanner 103 stores the scanned information as an image in the SD memory card 117. The second microcontroller 110 downloads the image from the SD memory card 117 and processes the image to extract the serving size, the calories per serving, the grams of fat per serving, the grams of carbohydrates per serving, and the grams of protein per serving. The second microcontroller 110 takes this information and stores it in the SD memory card 117 and uses the second wireless interface 116 to send this information to the first wireless interface 115 which sends this information to the first microcontroller 102. The first microcontroller 102 then takes the weight from the scale 119 and subtracts the tare weight to get the net weight. The first microcontroller 102 next takes the serving size information and calculates the number of servings contained in the food container 141. Using the number of servings estimate, the first microcontroller 102 can then estimate the number of calories, the number of grams of fat, the number of grams of carbohydrates, and the number of grams of protein that are stored in the food container 141. The first microcontroller 102 then displays this information on the first display 104. When the contents 142 of the food container 141 are changed, the new nutritional information label is scanned and the prior image file is replaced with the new image file. The first microcontroller 102 is power cycled and on power up the first microcontroller 102 will download and process the new image.

In a fourth optional scenario, several scans can be stored on the SD memory card 117 for reuse. In this first optional scenario, a touchscreen liquid crystal display is selected to be the first display 104. To change the displayed nutritional information displayed, the user touches the first display 104 which brings up a menu of the stored nutritional information images. The user selects the appropriate image and the second microcontroller 110 extracts the nutritional information and the first microcontroller 102 downloads this information and processes and displays the nutritional information on the first display 104.

The following definition was used in this disclosure:

Microcontroller: As used in this disclosure, a microcontroller is a programmable device that accepts digital and analog inputs, processes the digital and analog inputs according to previously stored instruction and to provide the results of these instructions as digital or analog outputs. Processor, microprocessors, and microcontrollers are synonyms.

With respect to the above description, it is to be realized that the optimum dimensional relationship for the various components of the invention described above and in FIGS. 1 through 8, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

Is shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A container station system comprising
a container station with a first electronic display;
wherein the container station is adapted to be used with a container of food physically separate from the container station, by placing contents of the food container into the container station;
wherein the electronic display displays nutritional information about the contents of the food container in the form of a nutritional label image captured from the container of food;
wherein the electronic display is operably connected to a remotely location station via a first wireless interface of the container station;
wherein the container station comprises a first microcontroller, the first display, a first power source, a first on off switch, a first housing, and a first wireless interface;
wherein the remote station further comprises a second microcontroller, a second display configured to display error messages and receive user commands and inputs, a memory device, a second power source, a second on off switch, a second housing and a second wireless interface;
wherein the first housing is a structure mounted on the outside of the food container;
wherein the first housing contains the first microcontroller, the first power source, and the first wireless interface;
wherein the first housing has mounted on it the first display and first on off switch;
wherein the second housing is a structure that is physically separate from the first housing and the food container and is configured to sit on a shelf or counter;
wherein the second housing contains the second microcontroller, the second power source, the memory device, and the second wireless interface;
wherein the second housing has mounted on it the second display and the second on off switch;
wherein the second electronic housing further comprises a scanner mounted on the second housing, and wherein the remote station is programmed to execute computerized instructions such that after turning on the remote station via the on off switch of the second housing, the scanner upon user activation;
captures an image of the nutritional label off the container of food of the contents of the container of food,
stores the image captured by the scanner is stored in the memory device,
the second microcontroller retrieves the stored image from the memory device,
the second microcontroller relays the image to the second wireless interfaces,
the second wireless interface transmits the image to the first wireless interface;
wherein the first wireless interface of the container station is programmed to execute computer instructions such that upon receipt of the transmitted image, the first wireless interface relays the image to the first microcontroller;
the first microcontroller is configured to display the image on the first display, upon receipt of the relayed image, the relayed image corresponding to the food within the container station, and wherein the memory device of the remote station is an SD memory card operable to store a plurality of images therein, wherein in response to user manipulation of the first display a corresponding one of the plurality of images is transmitted from the second wireless interface to the first wireless interface and relayed to the microcontroller for display, corresponding to contents of the container station placed therein from the food container.

* * * * *